United States Patent Office.

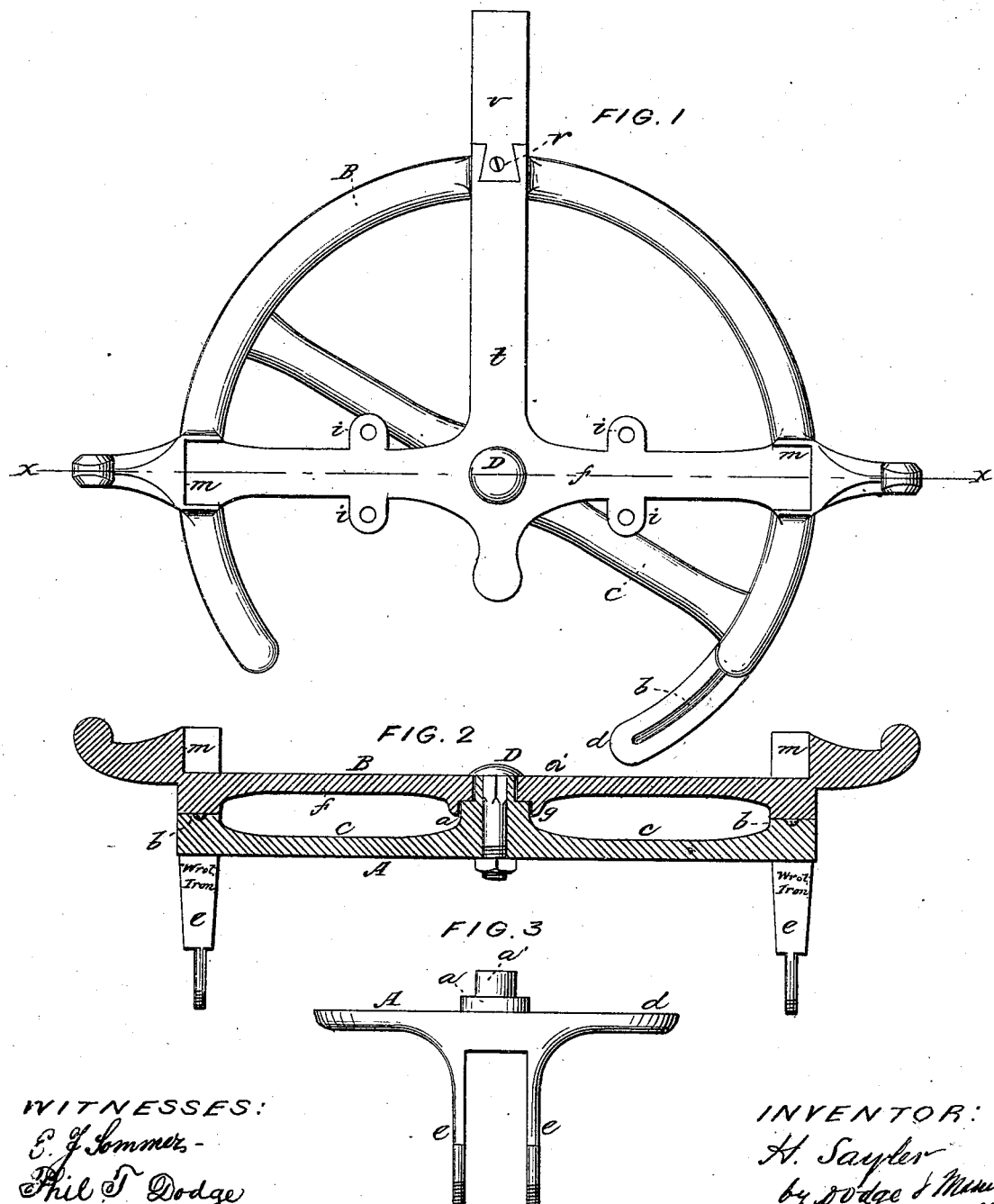

HENRY SAYLER, OF SAINT PARIS, OHIO.

Letters Patent No. 106,731, dated August 23, 1870.

IMPROVEMENT IN FIFTH-WHEELS FOR CARRIAGES.

The Schedule referred to in these Letters Patent and making part of the same.

*To all whom it may concern:*

Be it known that I, HENRY SAYLER, of Saint Paris, in the county of Champaign and State of Ohio, have invented certain Improvements in the Fifth-Wheels of Carriages, of which the following is a specification, reference being had to the accompanying drawing.

My invention consists in a fifth-wheel of novel form, constructed of wrought and cast-iron combined, as hereinafter described.

Figure 1 is a top plan view of my wheel;

Figure 2 is a vertical cross-section of the same, taken on the line X X of fig. 1; and Figure 3 is a side view of the lower half of the wheel.

The lower part of my wheel I construct of the same general form as those now in use, and in the upper side of its bearing-faces, $d$, form grooves, $b$, to contain oil or other lubricating material, and at the middle of its cross-bar, $c$, I form a boss, $a$, having a neck, $a'$, and make a vertical hole through said boss, as shown in fig. 2.

This half, B, of my wheel I cast in a single piece, with the exception of the axle-shanks $e$, which are made separately of wrought iron, and either have the body cast upon them, or else are screwed or otherwise secured to the body after the latter is cast.

The upper half, B, of my wheel I cast in one piece, of a size and form to correspond with the lower part, and through the middle of its cross-bar, $f$, I make a hole of the proper size to receive the neck $a'$ of the lower wheel, and around this hole, on the under side of the bar, I form a flange, $g$, to fit down over and around the boss $a$, as shown in fig. 2, so that, when the two parts A and B are fitted together, the boss will serve as the pivot or journal and receive all the lateral strain that is brought upon the king-bolt in the ordinary wheel.

Upon the ends of the bar $f$ I form raised flanges or sockets $m$ of U-shape, to receive and hold the ends of the head-block when the same is placed in position. The outer sides of the sockets I fashion into scrolls or other ornamental forms, so as to present the appearance of being the end of the head-block, as usually formed.

After fitting the wheel together and securing it in position on the carriage, with the head-block upon it, I pass a bolt, D, down through the head-block, the wheel, and the axle, so as to hold them all in their proper positions. This bolt is used in place of the ordinary king-bolt, but, being of much smaller diameter, it does not materially weaken the axle, as did the former.

On the sides of the bar $f$ I form ears, $i$, through which I pass the bolts or clips for holding the head-block and spring in position.

The upper part, B, of the wheel I form with a longitudinal arm or bar, $l$, at right angles to the cross-bar, and in the end of this bar I make a dovetailed recess, into which I insert the end of a wrought iron tang, $v$, and secure said tang by a screw, so as to form a wrought shank, to which the perch may be welded.

Having thus described my invention,

What I claim is—

1. A fifth wheel for carriages, consisting of the part A, provided with the central boss $a$, and having the wrought-iron clips $e$ secured thereto, in combination with the part B, constructed substantially as described.

2. The part B, having the recesses $m$ formed therein, for the reception and retention of the spring-block, substantially as set forth.

3. The dovetail recess, with the wrought-iron piece $v$ fitted therein, substantially as shown and described.

4. The part A, provided with the boss $a$, having a hole through it for the reception of the bolt D, in combination with the part B, having a hole for the upper portion of the boss $a$, and having also the flange $g$ to fit over said boss, all as herein described.

HENRY SAYLER.

Witnesses:
S. T. McMORRINS,
A. J. DAVIS.